Oct. 25, 1949.  J. BRUNEL  2,486,108
MACHINE TOOL AND THE LIKE
Filed May 22, 1947  8 Sheets-Sheet 1

FIG. 1.

INVENTOR
JEAN BRUNEL
BY Haseltine, Lake & Co.
AGENTS

Oct. 25, 1949.  J. BRUNEL  2,486,108
MACHINE TOOL AND THE LIKE
Filed May 22, 1947  8 Sheets-Sheet 5

INVENTOR
JEAN BRUNEL
BY Haseltine, Lake & Co.
AGENTS

Oct. 25, 1949.  J. BRUNEL  2,486,108
MACHINE TOOL AND THE LIKE

Filed May 22, 1947  8 Sheets-Sheet 6

INVENTOR
JEAN BRUNEL

BY Hazeltine, Lake & Co.
AGENTS

Oct. 25, 1949.　　　　J. BRUNEL　　　　2,486,108
MACHINE TOOL AND THE LIKE
Filed May 22, 1947　　　　8 Sheets-Sheet 7

INVENTOR
JEAN BRUNEL

BY *Haseltine, Lake & Co.*
AGENTS

Oct. 25, 1949. J. BRUNEL 2,486,108
MACHINE TOOL AND THE LIKE
Filed May 22, 1947 8 Sheets-Sheet 8

FIG.20

INVENTOR
JEAN BRUNEL

BY Haseltine, Lake & Co.
AGENTS

Patented Oct. 25, 1949

2,486,108

UNITED STATES PATENT OFFICE 2,486,108

MACHINE TOOL AND THE LIKE

Jean Brunel, Saint-Etienne, France

Application May 22, 1947, Serial No. 749,822
In France May 23, 1946

8 Claims. (Cl. 51—93)

This invention relates to machine-tools in general and more particularly to machine-tools for grinding flat surfaces.

Heretofore, in machine-tools and grinding machines, the various transverse and longitudinal movements of the carriages or tables were effected on guideways comprising dovetail, V-shape or other straight or angular shaped guides cast with the framework. Consequently the machining of heavy and bulky parts is very costly and the finish and super-finish required in precision machines are difficult to effect and necessitate considerable mechanical means. Furthermore, the large bearing surfaces sliding on one another require a considerable force to move them and, moreover, after the guideways have become slightly worn, the machines become useless for precision work and consequently the entire machine is wasted.

The principal object of the invention is to overcome these drawbacks by providing improvements in the construction of machine-tools in general and also in grinding machines, said improvements comprising novel arrangements with the use, in particular, of cylindrical guides which are easy to machine and to grind and are consequently economical to construct. This use furthermore facilitates maintenance, the removal of chips, emery and the like, while only requiring a very small mechanical force to move them.

In order that the invention may be clearly understood and readily carried into effect, the same will now be described, by way of example, with reference to the accompanying drawings, in which.

The improvements in the construction of machine-tools and grinding machines according to the invention comprise:

1. A T-shaped rack provided with a guideway and with shock-absorbers.

2. An oscillating grinding-head with micrometer adjustment.

3. Longitudinal and transverse cylindrical guideways for the carriage and for the table.

4. A diamond device for truing the wheel and provided with opening cases.

5. Nut and screw with take-up of play for the screw for the transverse control of the carriage.

6. A grinding-spindle with micrometer downward adjustment sliding between guideways with continuous take-up of play.

These features will now be described in greater detail.

1. *T-shaped rack provided with a guideway and with shock-absorbers.*—Heretofore, the rack was secured to the carriage which had to be moved and was directly driven by a pinion controlled by a hand-wheel; this arrangement produces a jerky feed caused by the normal play of the gears or that due to wear.

According to the present invention, the rack 1 is T-shaped and slides in a guideway provided underneath the carriage 2. Plates 3 screwed to the carriage 2 retain the rack 1 in position.

At each of its ends the rack 1 has a longitudinal housing corresponding to the adjustable guide 4 which is supported by the corresponding support 5, the support 5 being secured to the carriage 2. Coil springs 6 are interposed between the rack 1 and supports 5 to provide a flexible abutment. The whole arrangement is adapted to form a shock-absorber which, when the driving pinion 7 is engaged, renders possible a permanent contact between the teeth of the rack 1 and the pinion 7. There is, consequently, a take up of play which provides a drive that produces a continuous translation, without shocks or jerks, of the carriage 2. This smooth movement is particularly important in grinding and, in a general manner, for all machine-tools, such as milling machines, planing machines and continuously operating tube-expanding machines with forward and return strokes.

With these shock-absorbers, the rack 1, at each forward and return movement, while driving the carriage 2, does so with a certain flexibility; consequently, as the carriage 2 returns the part to be ground which it carries is not brought so violently into contact with the wheel but contacts the same flexibly, thereby eliminating the repeated shocks which ultimately wear out or deform the members.

Figure 12:
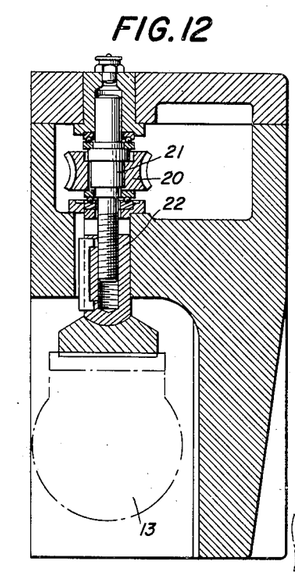
Figure 12 shows a view, in section through the axis c—d of Figure 13, of the micrometer screw.
Figure 13:
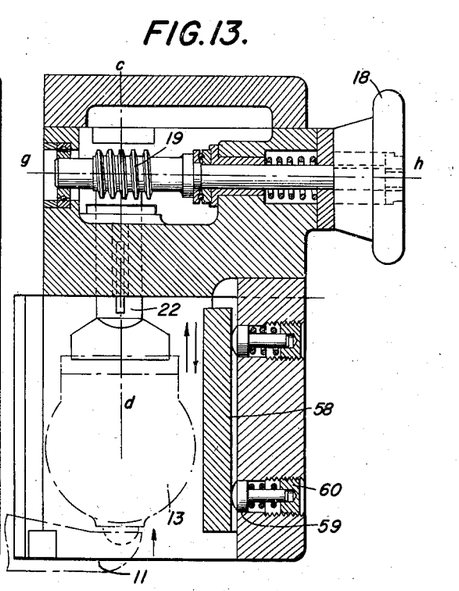
Figure 13 shows a view, in section through the axis e—f of Figure 14, of the drive of the worm.
Figure 14:
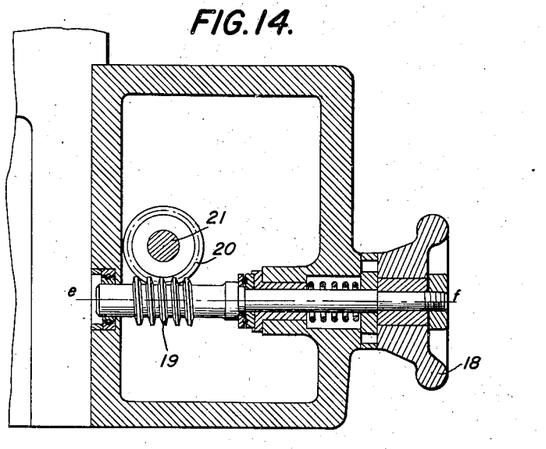
Figure 14 shows a sectional plan view, through the axis g—h of Figure 13, of the worm.
Figure 15:
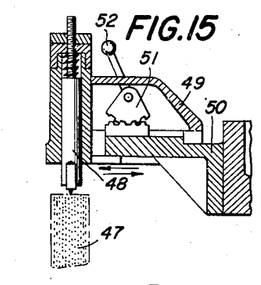
Figure 15 shows a small scale sectional elevation of the diamond device for truing the wheel.
Figure 16:
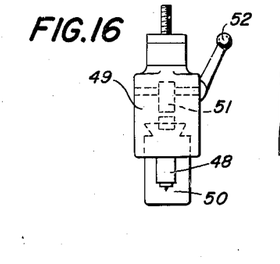
Figure 16 shows an outside end-view corresponding to Figure 15.

2. *Oscillating grinding-head with micrometer adjustment, according to Figures 12, 13 and 14 of the drawings.*—In order to produce this action, the plate 8 which supports the motor 9, is provided with two arms 10 and 11 swinging on pivoted bearings 12' of the vertical slide 12, one of said arms 11, being formed with a small arm 11¹ which terminates in the shape of a spherical cap adapted to bear against the grinding-spindle 13. It will be seen, therefore, that the weight of the motor 9 produces a continuous pressure on the grinding-spindle 13. In order to complete and adjust the said pressure, there is provided at the centre of the plate 8, a rod 15 which is secured to the plate 8 at the point 14. The rod 15 is arranged opposite and adapted to extend through a fixed part secured to the vertical slide 12. The rod is also provided with a tension spring 16 and a nut which enables the pulling action exerted by the spring 16 and consequently the pressure against the spindle 13 to be adjusted. In order, however, to make it very accurate the adjustment of this pressure is completed by a micrometer adjustment which is effected by means of a hand-wheel 18 adapted to rotate a worm 19 meshing with a worm wheel 20 driving a vertical shaft 21. The shaft 21 is formed with an abutment at its upper end and at the opposite end it screws into a non-rotary nut 22 adapted to slide with its key along a fixed groove. The lower end of the nut 22 is formed with a flat face adapted to bear against a flat part of the spindle 13.

The whole assembly of the grinding-head with its vertical slide 12, slides on a cylindrical column 23 of fairly large diameter. The said column is hollow to enable a vertical threaded member 24 to extend therethrough. The threaded member 24 is remote controlled through a pair of bevel pinions 25 by a horizontal shaft 26 having at its end and on the outside of the machine a hand-wheel 27. The whole arrangement is supported by the framework 36.

Vertical movement of the slide 12 and of the grinding-head assembly is effected by the action of an internal nut 28 engaging with the vertical threaded member 24, the internal nut 28 being secured to the vertical slide 12 by means of adjustable rods 29 sliding in a longitudinal slot 23' formed in the column 23. Each of the rods 29 is formed with a screw-threaded end and provided with an adjusting nut 29¹ fixed by means of screws 30 to the vertical slide 12 after the parallelism has been accurately adjusted.

The vertical slide 12 is fitted in its bearing on the cylindrical column 23 by means of a conical bush 31 and a lock-nut 32, its locking being effected by means of a lever screw 61 acting on two movable parts 62.

The internal nut 28 has a vertical bar 33 for bearing against the inside of the cylindrical column 23, which prevents any bending of the vertical threaded member 24 and consequently any resistance in its rotary action.

Figure 1:
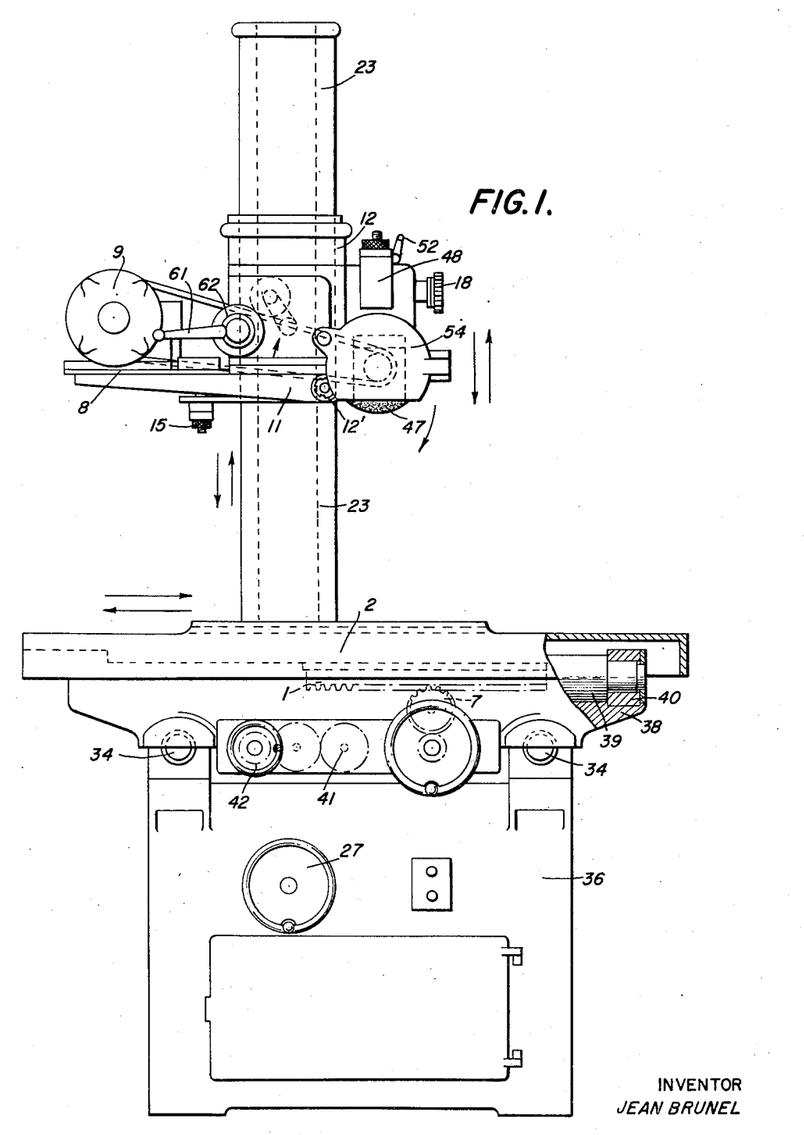
Figure 1 shows a general front elevational view on a small scale of a grinding machine constructed in accordance with the invention.
Figure 2:
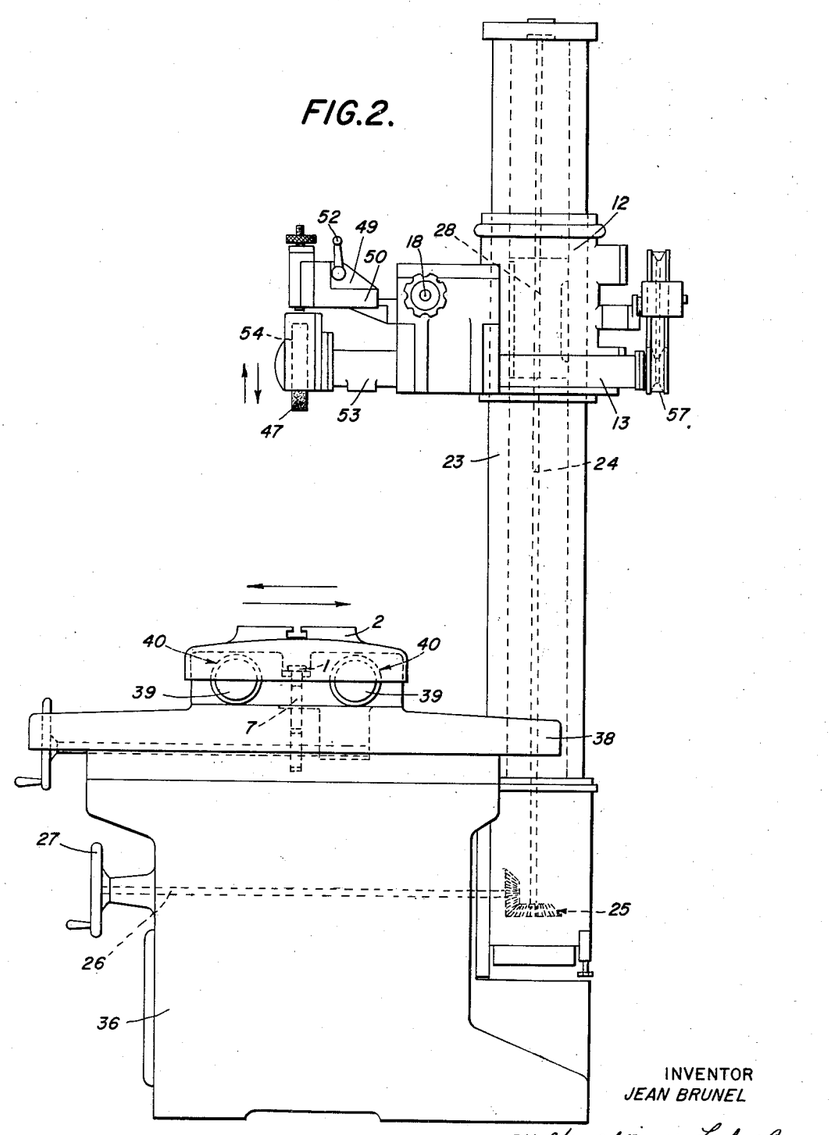
Figure 2 shows a general side elevational view on a small scale of a grinding machine constructed in accordance with the improvements.
Figures 3, 4, 5:
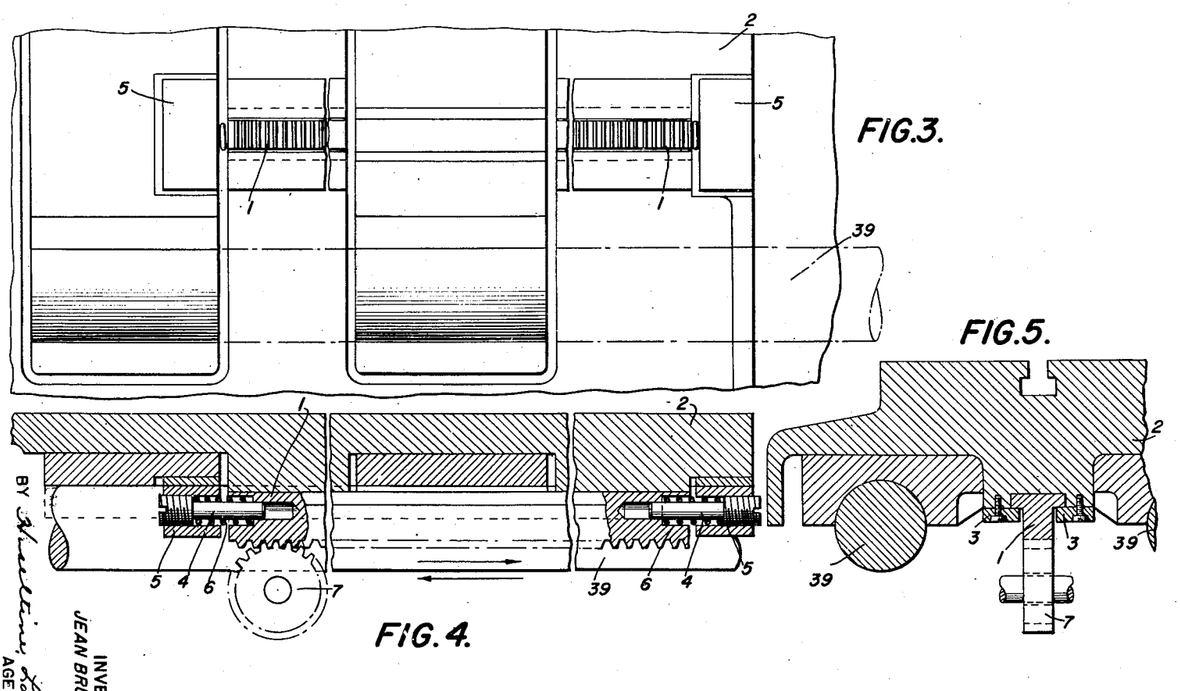
Figure 3 shows a partial plan view of the carriage from below.
Figure 4 is a longitudinal sectional view of the T-shaped rack provided with a guideway for the carriage and with shock-absorbers.
Figure 5 shows a side view, partly in section of the T-shaped rack provided with a guideway for the carriage and with shock-absorbers, corresponding to Figure 4.
Figure 6:
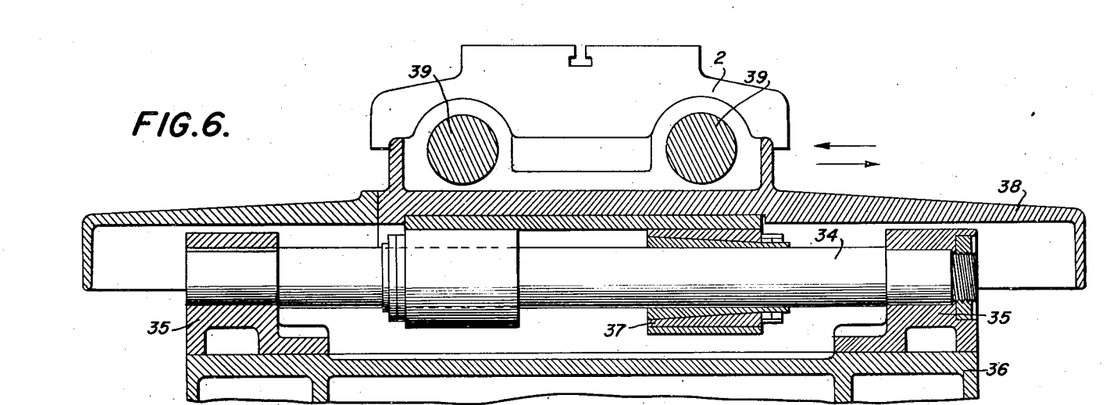
Figure 6 shows a sectional view of the upper part of the grinding machine in which can be seen a transverse guideway of the table and the longitudinal guideways of the carriage in their respective positions.
Figure 7:
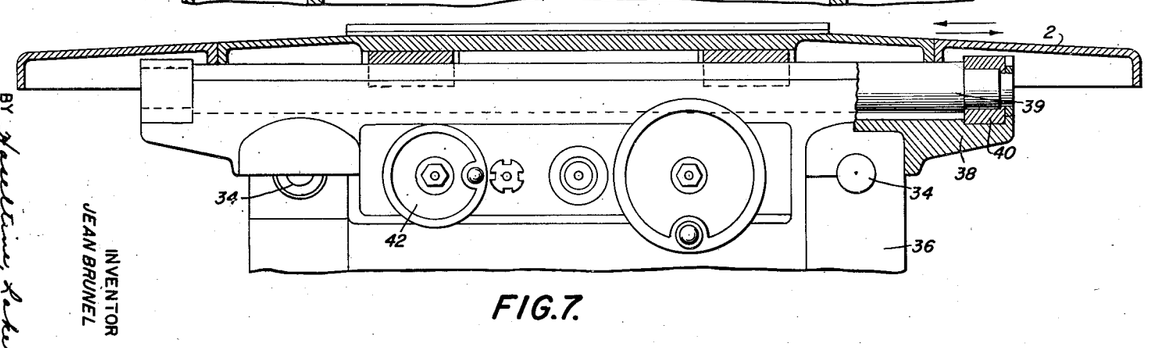
Figure 7 shows a sectional view of the upper part of the grinding machine in which can be seen a longitudinal guideway supporting the carriage.
Figures 8, 9, 10:
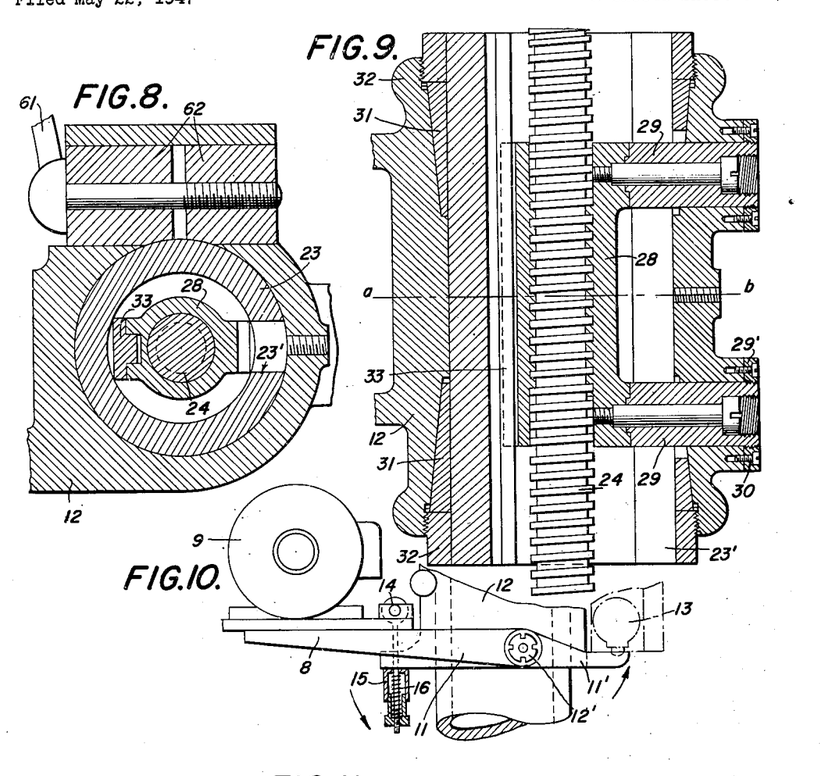
Figure 8 shows a view in transverse section along the axis a—b of Figure 9.
Figure 9 shows a view in vertical section of the slide assembly.
Figure 10 shows a small scale outside elevation, partly in section, of the motor support block (the portion in dot and dash lines representing the grinding-spindle).
Figure 11:
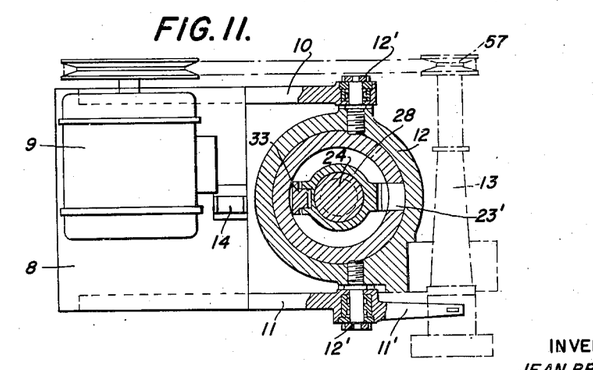
Figure 11 shows an outside plan view, partly in section, corresponding to Figure 10 (the portion in dot and dash lines representing the grinding-spindle).

3. *Cylindrical longitudinal and transverse guideways for the carriage and for the table, according to Figure 6 and 7 of the drawings.*—The slideways or guides for the table 38 comprise rods 34 formed with shoulders at their ends and supported by supports 35 secured to the framework 36, bushings 37 for taking up the play being housed in bosses of the table 38 and supporting the latter.

Similar arrangements are provided in the longitudinal direction in which the cylindrical rods 39 which are provided with shoulders and support the carriage 2 at their ends, are in their turn supported by fixed rests 40 which are secured to the table 38.

It will be understood that the construction of guideways in the form of hollow cylindrical rods also enables them to be used as cylinders in which hydraulically actuated pistons may move.

It is possible to effect the finishing and very easily the superfinishing of the cylindrical guideways, and this makes it possible to limit the length of the bearing surfaces by calculating them in accordance with the useful load, without impairing the lubrication. This provides a very smooth operation, a decrease of friction and a better lubrication.

With this application of cylindrical guideways it is even sufficient after wear to change the guideways while still using the framework of the machine which only acts as a support; consequently the machine can be used for an unlimited period.

Figure 20:
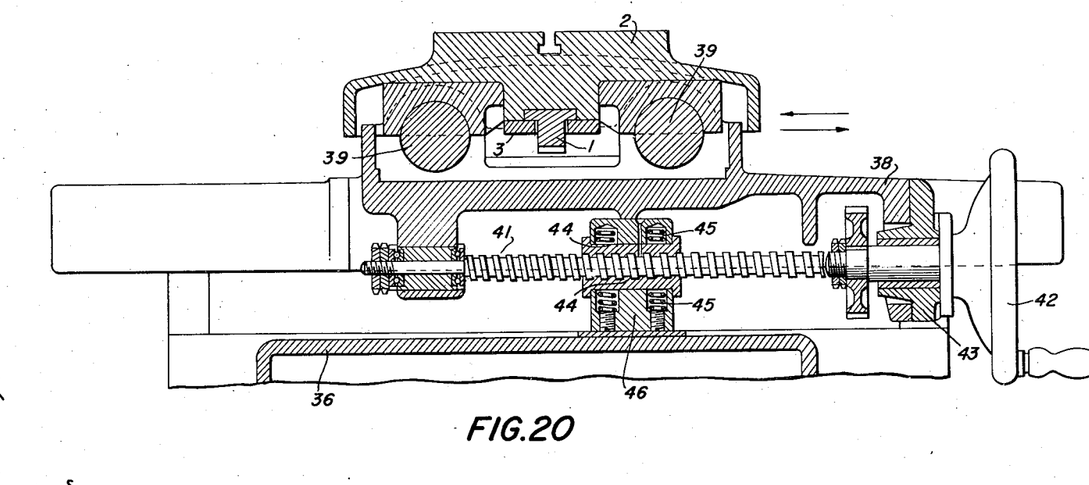
Figure 20 shows a view in transverse section showing the transverse control for the table and for its carriage.

4. *Transverse control of the table, according to Figure 20 of the drawings.*—A screw forming a shaft 41 is driven by intermediate pinions controlled by the external hand-wheel 42 which bears against a fixed support 43 of the table 38. Take up of possible play of the screw 41 is effected by means of a bipartite nut 44 with compression springs 45 which are housed in a support 46 secured to the framework 36. With this arrangement a continuous adjustment of the nut 44 is obtained without play.

5. *Diamond truing device with opening cases, according to Figures 15, 16, 17, 18 and 19 of the drawings.*—A vertical adjustable diamond holder 48 is secured above the wheel 47 to a horizontal carriage 49 sliding on the dovetailed face of a fixed support 50 and having a rack meshing with a toothed quadrant 51 controlled by an external lever 52. It is merely necessary to impart a movement to said lever in either direction in order to obtain appropriate movement of the adjustable vertical diamond-holder 48 and consequently a perfect truing of the wheel 47 without any danger.

However, it is necessary to protect the operator during the truing of the wheel 47 and for this purpose, there is provided at the end of the longitudinal support 53 which supports the spindle 13, a case 54 which may be opened by swinging about the pivot 55, said case 54, which normally surrounds the upper part of the wheel 47, protecting the operator during the grinding operation. It is necessary, however, during the truing of the wheels 47, to open the case 54 in order to allow the diamond-holder 48 to pass and, in this event, the uncovered wheel may be protected by a second inner case 56, which also pivots at 55, said inner case 56 being provided with a V-shaped opening which is sufficient to allow the diamond-holder 48 to pass through. against appropriate anti-friction bearings, and The grinding spindle or spindle 13 is housed in a longitudinal support 53 in which it bears at its end it is driven by a pulley 57 corresponding to the pulley of the motor 9.

Figure 17:
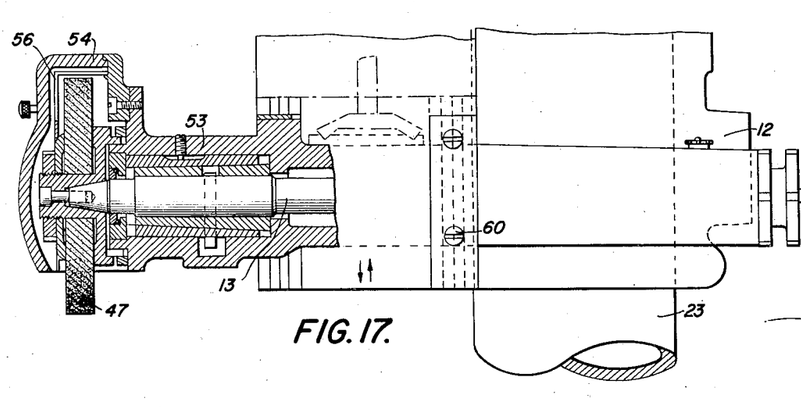
Figure 17 shows a view in partial longitudinal section of the grinding-spindle with its cases.
Figure 18:
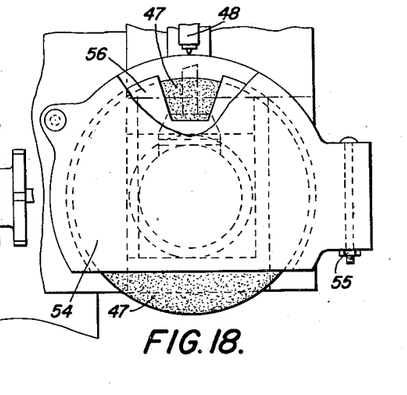
Figure 18 shows an outside side view in partial section, corresponding to Figure 17.
Figure 19:
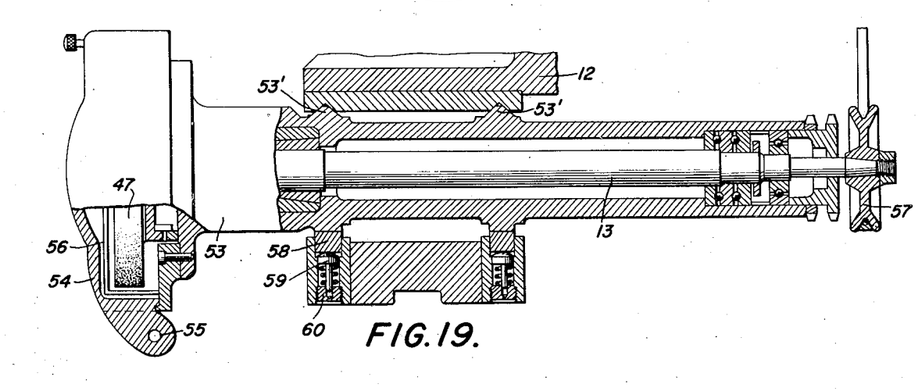
Figure 19 shows a plan view in partial section corresponding to Figure 17.

The longitudinal support 53 is formed with two male V-shaped bearing surfaces 53¹ which slide, upon movement of said support, in corresponding vertical grooves of the slide 12.

On the opposite side of the support 53, there are arranged wedges 58 with pushers 59, nuts and springs 60, the arrangement being such as to produce a constant pressure which prevents any play.

Thus constructed and applied, the improvements according to the invention, provide in simple form rugged and stable machines with interchangeable elements while, at the same time, enabling highly accurate parts to be manufactured.

It will be understood that the controls, belt tighteners and details of manufacture which have not been described in detail may be constructed in any desired known manner.

As is obvious and as it is already apparent from the foregoing, the invention is in no way limited to that of its methods of application, or to those methods of construction of its various parts which have been more especially mentioned; on the contrary, it includes all modifications.

I claim:

1. In a grinding machine tool and the like, the combination of an upright, a frame rigid therewith, a table and a carriage for carrying the work, supports rigid with the frame and constituting cylindrical bearings, trued cylindrical rods with ends of reduced diameter held inside said bearings, perforated bosses rigid with the table, bushes inside said bosses adapted to slidingly engage over the corresponding rods, rests rigid with the upper surface of the table and constituting cylindrical bearings, a second series of trued cylindrical rods with ends of reduced diameter rotatably engaging said bearings in said rests, means rigid with the underside of the carriage slidingly engaging the rods of the second series throughout the periphery thereof and means for controlling the sliding movements of the table and carriage.

2. In a grinding machine tool and the like, the combination of an upright, a frame rigid therewith, a table and a carriage for carrying the work, supports rigid with the frame and constituting cylindrical bearings, trued cylindrical rods with ends of reduced diameter held inside said bearings, perforated bosses rigid with the table, bushes inside said bosses adapted to slidingly engage over the corresponding rods, rests rigid with the upper surface of the table and constituting cylindrical bearings, a second series of trued cylindrical rods with ends of reduced diameter rotatably engaging said bearings in said rests, means rigid with the underside of the carriage slidingly engaging the rods of the second series throughout the periphery thereof, plates secured to the underside of the carriage and defining therewith a T-shaped slot, a rack slidably engaging said slot, buffering means engaging each end of the rack, means controlling the reciprocation of the rack and means for controlling the longitudinal movements of the table.

3. In a grinding machine tool and the like, the combination of an upright, a frame rigid therewith, a table and a carriage for carrying the work, supports rigid with the frame and constituting bearings of semi-circular shape, half bushes associated with said bearings to form a closed bearing surface, means for rigidly securing said half bushes to the cooperating bearings, trued cylindrical rods with ends of reduced diameter held inside said bearings, perforated bosses rigid with the table, bushes inside said bosses adapted to slidingly engage over the corresponding rods, rests rigid with the upper surface of the table, and constituting bearings of semi circular shape, half bushes associated with said bearings to form a closed bearing surface, means for rigidly securing said half bushes to the cooperating bearings, a second series of trued cylindrical rods with ends of reduced diameter rotatably engaging said bearings in said rests, means rigid with the underside of the carriage slidingly engaging the rods of the second series throughout the periphery thereof and means for controlling the sliding movements of the table and carriage.

4. In a grinding machine tool and the like, the combination of an upright, a frame rigid therewith, a table and a carriage for carrying the work, supports rigid with the frame and constituting cylindrical bearings, trued cylindrical rods with ends of reduced diameter held inside said bearings, perforated bosses rigid with the table, bushes inside said bosses adapted to slidingly engage over the corresponding rods, rests rigid with the upper surface of the table and constituting cylindrical bearings, a second series of trued cylindrical rods with ends of reduced diameter rotatably engaging said bearings in said rests, means rigid with the underside of the carriage slidingly engaging the rods of the second series throughout the periphery thereof and means for controlling the sliding movements of the table and carriage, a transversal spindle, a head with a grindwheel carried thereby for operation of the work carried by the carriage, a vertical slide movable along the column and in which the driving spindle is rotatably held, a motor plate pivotally secured to the slide to rock in a direction perpendicular to the spindle, a motor for the spindle carried by said plate and forming a weight urging vertically the spindle, an adjustable spring cooperating with the weight of the motor and means for controlling micrometrically the position of the spindle.

5. In a grinding machine tool and the like, the combination of an upright, a frame rigid therewith, a table and a carriage for carrying the work, supports rigid with the frame and constituting cylindrical bearings, trued cylindrical rods with ends of reduced diameter held inside said bearings, perforated bosses rigid with the table, bushes inside said bosses adapted to slidingly engage over the corresponding rods, rests rigid with the upper surface of the table and constituting cylindrical bearings, a second series of trued cylindrical rods with ends of reduced diameter rotatably engaging said bearings in said rests, means rigid with the underside of the carriage slidingly engaging the rods of the second series throughout the periphery thereof and means for controlling the sliding movements of the table and carriage, a transversal spindle, a head with a grindwheel carried thereby for operation on the work carried by the carriage, a vertical hollow slide movable along the column and on which the driving spindle is rotatably held, a vertical threaded member and a nut therefor housed inside the slider, means for adjusting the height of said nut inside the upright through rotation of the threaded member, means for securing the nut in exact parallelism inside the slider including supporting rods passing through the slider and upright walls and engaging the nut wall and means for adjustably and removably securing in a rigid manner the supporting rods to the nut and slider.

6. In a grinding machine tool and the like, the combination of an upright, a frame rigid therewith, a table and a carriage for carrying the work, supports rigid with the frame and constituting cylindrical bearings, trued cylindrical rods with ends of reduced diameter held inside said bearings, perforated bosses rigid with the table, bushes inside said bosses adapted to slidingly engage over the corresponding rods, rests rigid with the upper surface of the table and constituting cylindrical bearings, a second series of trued cylindrical rods with ends of reduced diameter rotatably engaging said bearings in said rests, means rigid with the underside of the carriage slidingly engaging the rods of the second series throughout the periphery thereof and means for controlling the sliding movements of the table and carriage, a grinding wheel adapted to be adjusted vertically over the carriage and means adjustably secured to the upright and carrying said wheel, a diamond truing device adapted to cooperate with the grinding wheel, a rack and pinion system adapted to control the transversal location of said truing device over the edge of the grinding wheel, an apertured swingable casing surrounding the grinding wheel and allowing the latter to project downwardly through the aperture therein and an inner casing inside the former casing and having an upper cut away portion registering with the upper part of the grinding wheel for allowing the passage of the truing device into and out of its operative position.

7. In a grinding machine tool and the like, the combination of an upright, a frame rigid therewith, a table and a carriage for carrying the work, supports rigid with the frame and constituting cylindrical bearings, trued cylindrical rods with ends of reduced diameter held inside said bearings, perforated bosses rigid with the table, bushes inside said bosses, adapted to slidingly engage over the corresponding rods, rests rigid with the upper surface of the table and constituting cylindrical bearings, a second series of trued cylindrical rods with ends of reduced diameter rotatably engaging said bearings in said rests, means rigid with the underside of the carriage slidingly engaging the rods of the second series throughout the periphery thereof and carriage and table controlling means including for at least one of the carriage and table members, a handwheel, a longitudinal worm controlled thereby and two cooperating half nuts engaging said worm, a spring urging same together and means whereby the worm controls the member considered.

8. In a grinding machine tool and the like, the combination of an upright, a frame rigid therewith, a table and a carriage for carrying the work, supports rigid with the frame and constituting cylindrical bearings, trued cylindrical rods with ends of reduced diameter held inside said bearings, perforated bosses rigid with the table, bushes inside said bosses adapted to slidingly engage over the corresponding rods, rests rigid with the upper surface of the table and constituting cylindrical bearings, a second series of trued cylindrical rods with ends of reduced diameter rotatably engaging said bearings in said rests, means rigid with the underside of the carriage slidingly engaging the rods of the second series throughout the periphery thereof and means for controlling the sliding movements of the table and carriage, a transversal spindle, a head with a grindwheel carried thereby for operation of the work carried by the carriage, a casing for said grindwheel spindle, means whereby said casing slidingly engages the upright pusher members, a member rigid with the frame carrying same and springs urging the pushers against the grindwheel spindle casing to hold the latter against the upright.

JEAN BRUNEL.

REFERENCES CITED

The following references are of record in the file of this patent:

UNITED STATES PATENTS

| Number | Name | Date |
| --- | --- | --- |
| 1,515,039 | Hanson | Nov. 11, 1924 |
| 2,019,677 | Huxford | Nov. 5, 1935 |
| 2,309,669 | Poorman | Feb. 2, 1943 |
| 2,323,780 | Kline | July 6, 1943 |
| 2,386,283 | Wiken et al. | Oct. 9, 1945 |